(12) United States Patent  (10) Patent No.: US 8,702,068 B2
Mellins et al.  (45) Date of Patent: *Apr. 22, 2014

(54) ANIMAL-RESISTANT FENCE AND METHOD FOR ASSEMBLING AND USING THE SAME

(71) Applicants: Sue M. Mellins, New York, NY (US); Jon M. Conard, New York, NY (US)

(72) Inventors: Sue M. Mellins, New York, NY (US); Jon M. Conard, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/675,626

(22) Filed: Nov. 13, 2012

(65) Prior Publication Data

US 2013/0193393 A1  Aug. 1, 2013

Related U.S. Application Data

(63) Continuation of application No. 13/344,747, filed on Jan. 6, 2012, now Pat. No. 8,308,141.

(51) Int. Cl.
  *E04H 17/16* (2006.01)
(52) U.S. Cl.
  USPC .................................. 256/25; 256/11; 47/30
(58) Field of Classification Search
  USPC ............... 256/25, 26, 27, 33, 11, 24, DIG. 5; 47/29.6, 30, 31, 32, 33
  See application file for complete search history.

(56) References Cited

U.S. PATENT DOCUMENTS

| | | |
|---|---|---|
| 321,171 A | 6/1885 | Archibald |
| 504,936 A | 9/1893 | Niles |
| 1,270,112 A | 6/1918 | Brown |
| 1,565,431 A * | 12/1925 | Fairchild et al. ................ 256/11 |
| 1,773,519 A | 8/1930 | Cox |
| 1,800,116 A | 4/1931 | Thom |
| 1,839,239 A | 1/1932 | Mahoney |
| 2,161,944 A | 6/1939 | Bauer |
| 3,028,147 A | 4/1962 | Crumbo |
| 3,084,913 A | 4/1963 | Cox |
| 3,423,072 A * | 1/1969 | Bernstein ........................ 256/24 |
| 3,749,368 A | 7/1973 | Miller |
| 3,771,767 A | 11/1973 | Dougherty |
| 3,806,095 A | 4/1974 | Ford |
| 4,072,295 A | 2/1978 | Roberts |
| 4,081,177 A | 3/1978 | Graff |
| 4,159,820 A | 7/1979 | Parisien |
| 4,270,736 A | 6/1981 | Burch |
| 4,348,012 A | 9/1982 | McLoughlin |
| 4,408,748 A | 10/1983 | Lewis |
| 4,526,347 A * | 7/1985 | McLoughlin .................... 256/33 |
| 4,603,840 A | 8/1986 | Simkin |
| 4,673,166 A | 6/1987 | MacDougall |
| 4,685,656 A * | 8/1987 | Lee et al. ......................... 256/24 |
| 5,083,396 A * | 1/1992 | Traut ................................. 47/31 |
| 5,143,354 A | 9/1992 | Nolan |
| 5,267,724 A * | 12/1993 | Heath et al. ..................... 256/11 |
| 5,421,557 A * | 6/1995 | Vise ................................. 256/24 |
| 5,542,649 A * | 8/1996 | Allegaert et al. ............... 256/54 |
| 5,662,313 A | 9/1997 | Forrester |

(Continued)

*Primary Examiner* — Michael P Ferguson
(74) *Attorney, Agent, or Firm* — Carter, DeLuca, Farrell & Schmidt, LLP

(57) ABSTRACT

An animal-resistant fence preventing entry of animals includes a first post, a second post, and a first panel member extending between the two posts. The fence further includes a second panel member extending from an upper portion of the first panel member above the ground level, and a third panel member extending from a lower portion of the first panel member beneath the ground level.

9 Claims, 8 Drawing Sheets

(56) References Cited

U.S. PATENT DOCUMENTS

| | | | |
|---|---|---|---|
| 5,860,636 A * | 1/1999 | Duncan et al. | 256/DIG. 5 |
| 5,944,114 A | 8/1999 | Farley | |
| 6,010,116 A | 1/2000 | Knott, Sr. | |
| 6,045,099 A * | 4/2000 | Aiken et al. | 248/218.4 |
| 6,113,076 A | 9/2000 | Hancock-Bogese et al. | |
| 6,199,831 B1 | 3/2001 | Patrick et al. | |
| 6,360,481 B1 | 3/2002 | Nesic | |
| 6,585,233 B1 | 7/2003 | Sorben | |
| 6,880,811 B2 | 4/2005 | Burdick | |
| 7,216,854 B2 | 5/2007 | Bryan | |
| 7,562,453 B1 * | 7/2009 | Benner et al. | 256/11 |
| 2003/0209701 A1 * | 11/2003 | Goddard | 256/47 |
| 2004/0206947 A1 | 10/2004 | Rosaen | |
| 2007/0130824 A1 | 6/2007 | Teich | |
| 2007/0151150 A1 | 7/2007 | Sandoval | |
| 2007/0252125 A1 * | 11/2007 | Thompson | 256/24 |
| 2008/0179577 A1 * | 7/2008 | Neusch | 256/24 |
| 2008/0277638 A1 * | 11/2008 | Benner et al. | 256/11 |
| 2010/0224848 A1 | 9/2010 | Singer et al. | |

* cited by examiner

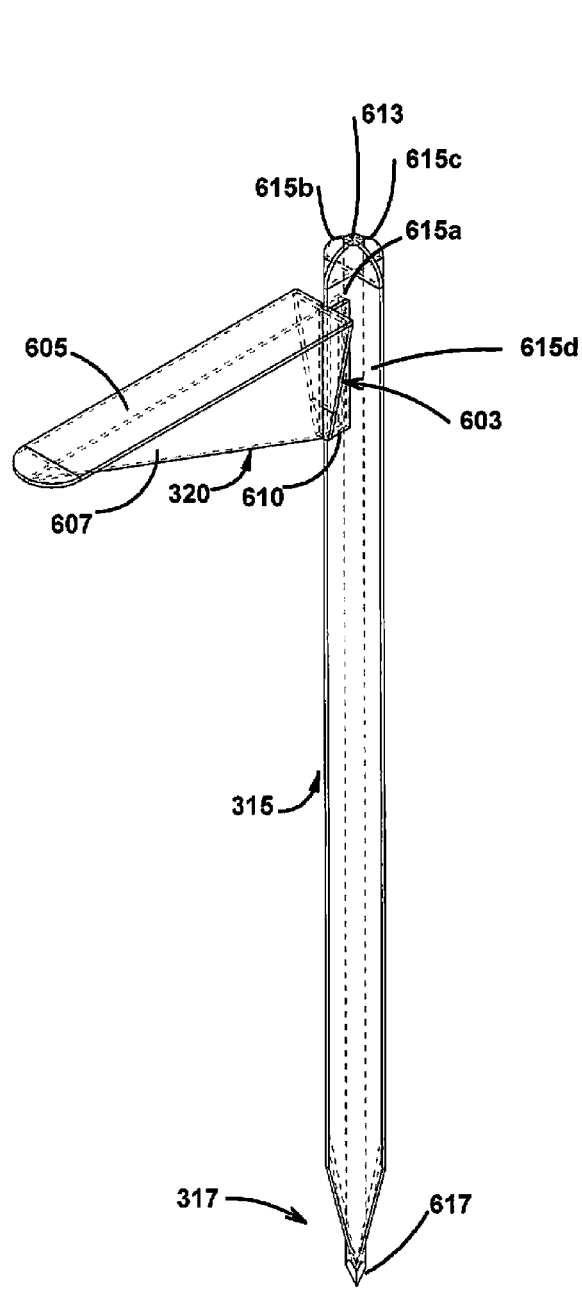
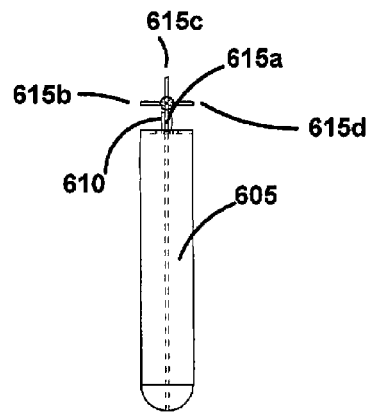
FIG. 5B
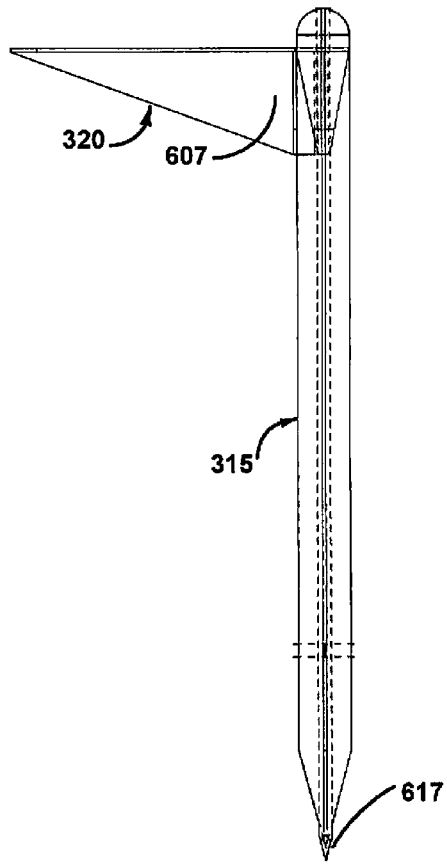
FIG. 5A
FIG. 5C

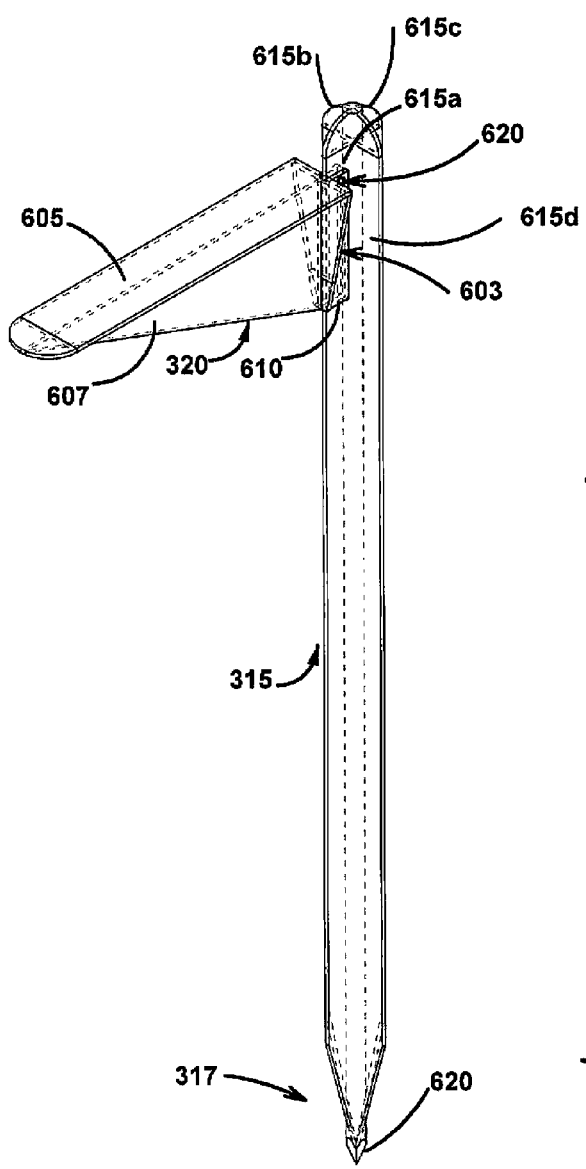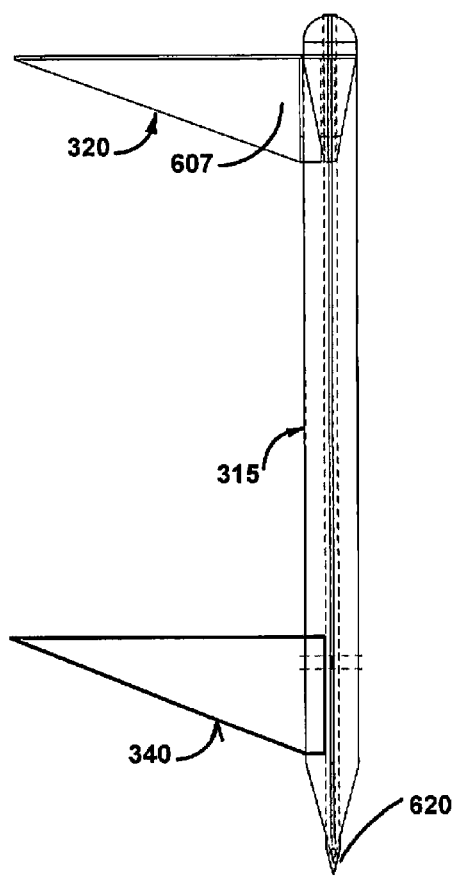
FIG. 5D
FIG. 5E

ANIMAL-RESISTANT FENCE AND METHOD FOR ASSEMBLING AND USING THE SAME

CROSS-REFERENCE TO RELATED APPLICATIONS

This application is a continuation of U.S. patent application Ser. No. 13/344,747, filed on Jan. 6, 2012, the content of which is incorporated by reference herein in its entirety.

BACKGROUND

1. Technical Field

The present disclosure relates generally to fences and, more particularly, to fences for preventing rodents, vertebrate pests, and other animals from entering an area, such as a garden.

2. Background of Related Art

Many rural and suburban properties throughout the world include a garden. Professional and amateur gardeners spend a great amount time and money in creating and maintaining these gardens. Gardeners raise a variety of plants in their gardens including fresh fruits, vegetables, herbs, and flowers. These plants, however, can be destroyed by various hungry and mischievous animals, including rabbits, raccoons, groundhogs, and rodents. As a result, an extensive industry has developed a variety of products using mechanical, electrical, chemical, and/or or biological strategies to prevent plant-damaging animals from entering a garden and eating or otherwise damaging plants in the garden. These products, however, are not entirely effective against plant-damaging animals.

Some of the mechanical products for repelling animals include inanimate animal predators and enclosures. The inanimate animal predators are replicas of predatory animals such as hawks or owls, which act as "scarecrows." These scarecrows can be effective for short durations until the animals learn that the inanimate animal predators pose little or no threat.

The products in the form of enclosures are typically fences that enclose a garden and form an impenetrable barrier against plant-damaging animals. These fences, however, are often not an effective barrier against hungry and clever animals. Absent a total enclosure (e.g., a greenhouse), fences can be scaled or tunneled under by animals. Moreover, these fences are difficult to install and are difficult for gardeners to access.

Garden fences are more effective against animals the greater their height. But taller fences may negatively affect the aesthetics of the garden and block light that is crucial to the healthy growth of plants in the garden.

Alternatively, gardeners can use chemicals to repel plant-damaging animals. These chemicals are typically natural substances such as blood meal and urine or man-made chemicals such as naphtha and Ro-pel, which create an odor that repels certain animals. These chemicals, however, have at least three major drawbacks: (1) they can be offensive to humans because they must be used in substantial amounts to be effective, (2) they are dependant on the direction and magnitude of the wind direction, and (3) they must be frequently applied because they are water-soluble.

SUMMARY

The present disclosure features a fence for preventing entry of animals and a method of installing the fence. The fence is an effective mechanism for repelling animals that can be easily installed, provide easy access for gardeners, maintain the aesthetics of the garden, and promote healthy growth of plants in the garden.

One aspect of the present disclosure features a fence including a first post and a second post. The fence further includes a first panel extending between the first post and the second post, a second panel extending from an upper portion of the first panel, and a third panel extending from a lower portion of the first panel. The fence may further include a strut attached to an upper portion of the first post and a second strut attached to an upper portion of the second post. The first strut and second strut are configured to support the second panel member.

In some embodiments, the strut and the post are integrated into a single component of the fence. In some embodiments, the second panel extends substantially perpendicularly from an upper portion of the first panel. Similarly, the third panel extends substantially perpendicular from a lower portion of the first panel.

In some embodiments, at least one of the first panel, the second panel, and the third panel includes a mesh material. In other embodiments, at least one of the first panel, the second panel, and the third panel includes a metallic material. In yet other embodiments, at least one of the first panel, the second panel and the third panel includes a transparent material.

In some embodiments, the fence includes a gate hingedly attached to a post. In some embodiments, at least a portion of the first panel is configured to be disposed below the surface of the ground.

In another aspect of the present disclosure, the fence comprises a first barrier positioned approximately perpendicular to ground level and a second barrier extending from a lower portion of the first barrier. The first barrier defines an enclosure. Also, a lower portion of the first barrier is configured to be disposed below the surface of the ground.

In some embodiments, the second barrier extends from the lower portion of the first barrier at an angle that is substantially 90 degrees with respect to the first barrier. In other embodiments, the second barrier extends from the lower portion of the first barrier at an angle that is substantially 75 degrees with respect to the first barrier.

In some embodiments, a third barrier extends from an upper portion of the first barrier.

In some embodiments, the first barrier includes a non-biodegradable material.

In yet another aspect of the present disclosure features a method of assembling a fence on a section of ground, includes placing a plurality of posts into the ground, attaching a first panel member to two adjacent posts of the plurality of posts, attaching a strut to an upper portion of each post, attaching a second panel member to the strut, attaching a third panel member to a lower portion of the first panel member. The strut extends at an angle from its attached post. The third panel member defines an angle with respect to the first panel.

The method may also include removing a portion of the ground adjacent to the first panel member, attaching the third panel member to the lower portion of the first panel member, and covering the third panel member with the removed portion of the ground. The method may further include attaching a first corner panel member to the upper portion of at least one of the plurality of posts, and attaching a second corner panel member to a lower portion of the at least one of the plurality of posts. The method may further include attaching a gate panel member to at least one of the plurality of posts.

BRIEF DESCRIPTION OF THE DRAWINGS

The animal-resistant fence and method for installing and using the same will now be described with reference to the accompanying drawings, in which:

FIG. 5A is a perspective view of one embodiment of a post of the animal-resistant fence of FIG. 1;

FIG. 5B is a top-down view of the post of FIG. 5A;

FIG. 5C is a side view of the post of FIG. 5A;

FIG. 5D is a perspective view of another embodiment of a post of the animal-resistant fence of FIG. 1;

FIG. 5E is a side view of yet another embodiment of a post of the animal-resistant fence of FIG. 1;

DETAILED DESCRIPTION

An animal-resistant fence according to embodiments of the present disclosure will now be described with reference to the drawings.

Figure 1:
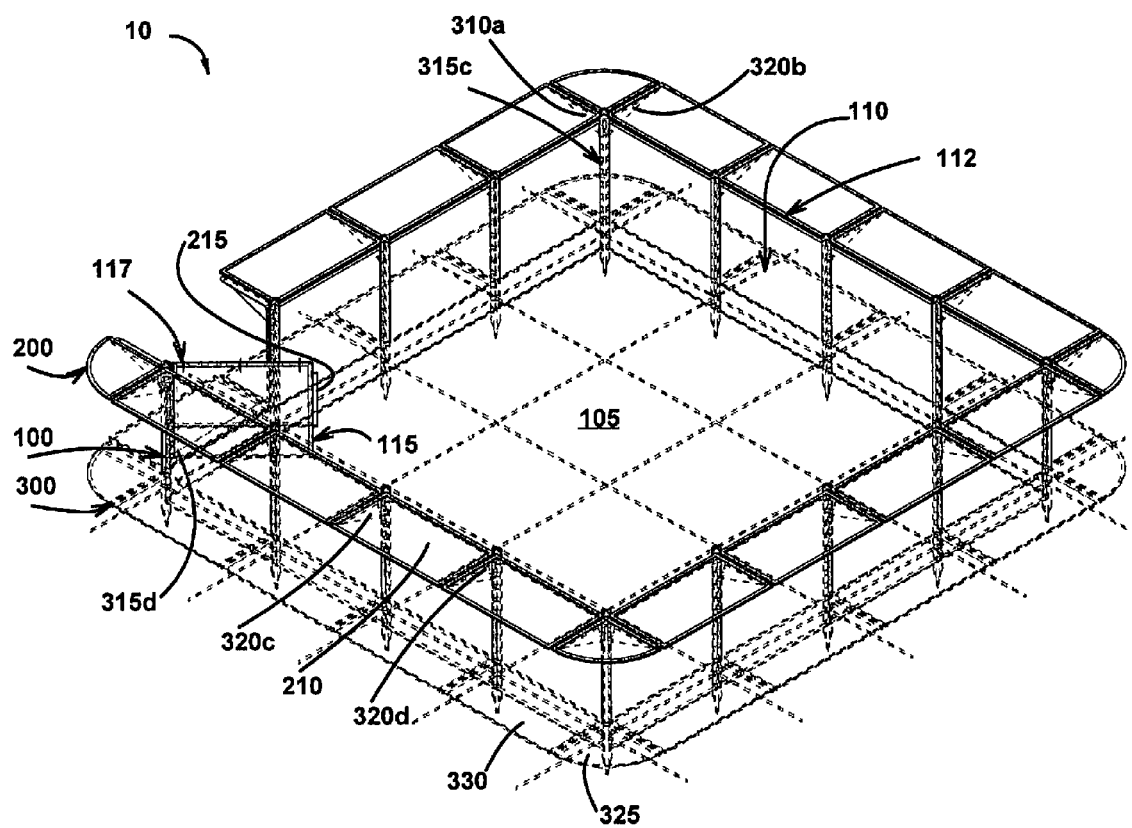
FIG. 1 is a perspective view of an animal-resistant fence according to embodiments of the present disclosure.

FIG. 1 illustrates an animal resistant fence 10 in a grid layout 105. As shown in FIG. 1, the fence 10 generally defines a square-shaped enclosure. The fence 10 may also define other enclosure configurations, such as polygon-shaped enclosures. The fence 10 includes three barriers: (1) a first barrier 100 placed in the ground perpendicular to the ground level so that at least a portion of the first barrier 100 is beneath the ground level, (2) a second barrier 200 placed above the ground level and extending from an upper portion of the first barrier 100, and (3) a third barrier 300 placed beneath the ground and extending from a lower portion of the first barrier 100.

The first barrier 100 includes a plurality of first, vertical panels 110 positioned perpendicular to the ground level. Each first, vertical panel 110 may have a rectangular shape or a square shape. The first barrier 100 further includes a gate 115 that provides access to the area enclosed by the fence 10. The gate 115 comprises a planar panel member. As illustrated in FIG. 1, the gate 115 may be moved from a completely open state, to a partially open state, and further to a completely closed state.

Figure 2:
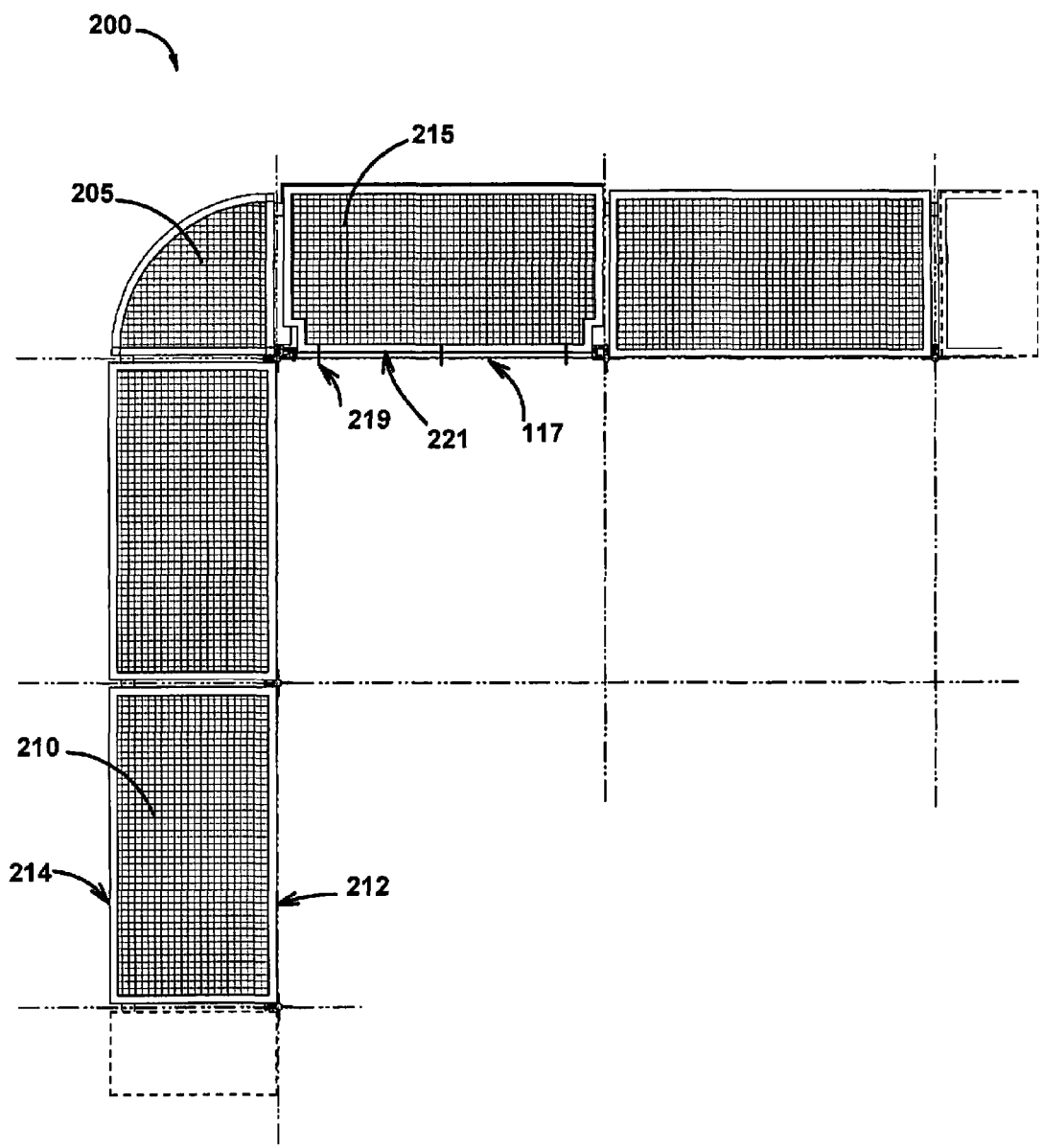
FIG. 2 is a top-down view of a portion of the animal-resistant fence of FIG. 1.

As illustrated in FIG. 2, the second barrier 200 is mounted at the top portion of the first barrier 100. In some embodiments, the second barrier 200 is generally parallel to the ground level and is generally perpendicular to the first barrier 100. The second barrier 200 includes a plurality of second, upper panels 210. Each second panel 210 may have a rectangular shape or any other suitable shape. Each second panel 210 of the second barrier 200 corresponds to a first panel 110 of the first barrier 100. Each second panel 210 extends perpendicularly from the upper edge 112 of a corresponding first panel 110. In some embodiments, a first side 212 of each second panel 210 is adjacent to the upper edge 112 of a corresponding first panel 110. Further, each second panel 210 extends outwardly beyond the boundary defined by the first barrier 100 to prevent invasion of animals over the upper edge 112 of the first panel 110.

In some embodiments, each second panel 210 is generally positioned at a 90° angle with respect to a corresponding first panel 110. In this manner, the second barrier 200 is generally perpendicular to the first barrier 100. In other embodiments, each second panel 210 is positioned at a 75° angle with respect to a corresponding first panel 110. In yet other embodiments, each second panel 210 is positioned at a suitable acute or obtuse angle with respect to a corresponding first panel 110. In this manner, the second barrier 200 forms an acute or obtuse angle with respect to the first barrier 100.

The barrier 200 further includes at least one upper corner panel 205 positioned at an upper corner of the fence 10. In some embodiments, the barrier 200 includes four corner panels 205, each positioned at a different upper corner of the rectangular-shaped or square-shaped fence 10. As illustrated in FIG. 2, the corner panel 205 is planar having a curved outer edge (e.g., having a quarter-circle shape). In other embodiments, the corner panel 205 may have a non-planar geometry. In yet other embodiments, the outer edge of the corner panel 205 may have other shapes. For example, the corner panel 205 may form a square so that the outer edge of the corner panel 205 is defined by two sides of the square.

The barrier 200 further includes an upper gate panel 215 which is hingedly attached to an upper edge 117 of the gate 115 via three circular hooks 219, as shown in FIG. 2. The circular hook 219 defines a closed loop and secures one side of the upper gate panel 215 to the upper edge 117 of the gate 115. Accordingly, the upper gate panel 215 can freely rotate with respect to the gate 115 about the circular hook 219. In other embodiments, the upper gate panel 215 may be attached to the gate 115 via other types of mechanisms that facilitate rotation of the upper gate panel 215 with respect to the gate 115 about the upper edge 117 of the gate 115.

Figure 3:
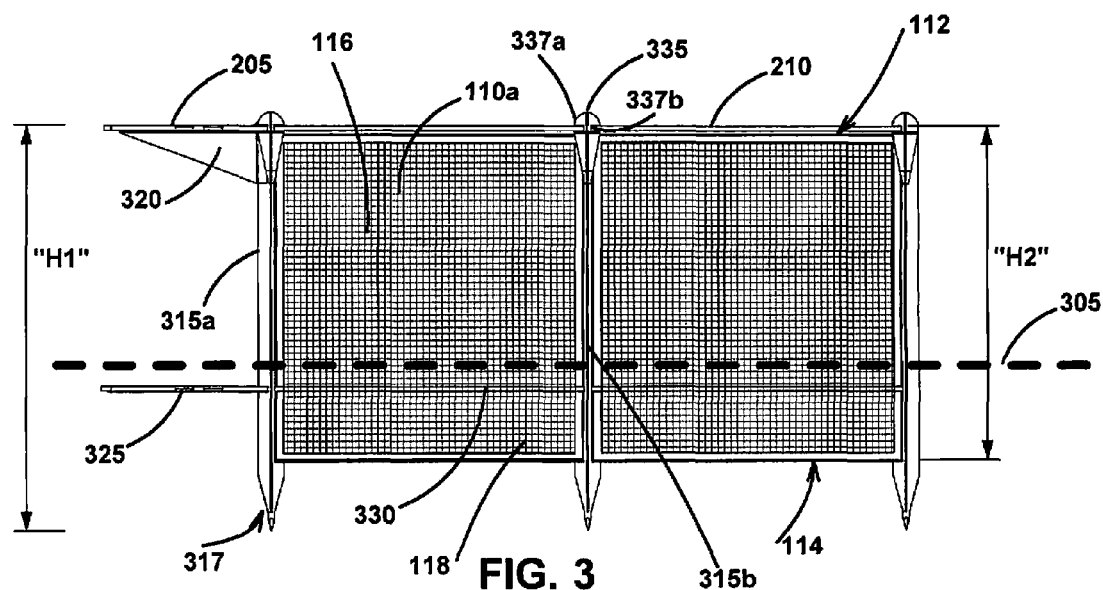
FIG. 3 is a side view of a portion of the animal-resistant fence of FIG. 1.

As shown in FIG. 3, each vertical panel 110 includes a first, upper portion 116 above the ground level 305, and a second, lower portion 118 below the ground level 305. A post 315, e.g. 315b illustrated in FIG. 3, is positioned between each pair of first panels 110. Each first panel 110 is mounted between two of these posts 315. For instance, as illustrated in FIG. 3, the first panel 110a is supported by a first post 315a and a second post 315b. Each post 315 supports two first panels 110, so that the first panels 110 can maintain their vertical position even when a force is applied to one of the first panels 110. Each post 315 has a lower, end 317 that extends beyond the lower edge 114 of the first panel 110. The lower, end 317 has a sharp edge to facilitate insertion into the ground.

Each first post 315 also includes an upper end 335. Each upper end 335 includes at least two grooves 337a and 337b, each being dimensioned to receive an edge of a second panel 210. The first post 315 has a height "H1," which is defined as the distance between the lower end 317 and the upper end 335 of the first post 315. Each first panel 110 has a height "H2," which is defined as the distance between the lower edge 114 and the upper edge 112 of the first panel 110. As shown in the embodiment of the fence of FIG. 3, the height "H1" is greater than the height "H2."

As shown in FIGS. 1 and 3, a strut 320 is disposed at the upper end 335 of each of the posts 315. Two struts, e.g., struts 320a and 320b, are attached to each of the corner posts, e.g., post 315c. The two struts 320a and 320b are placed at 90° with respect to each other to support an upper corner panel 205. Further details regarding the struts 320 are discussed below with reference to FIGS. 5A-5C. As shown in FIG. 1, each second panel 210 is supported by two struts 320c and 320d that are mounted on two posts 315.

Figure 4:
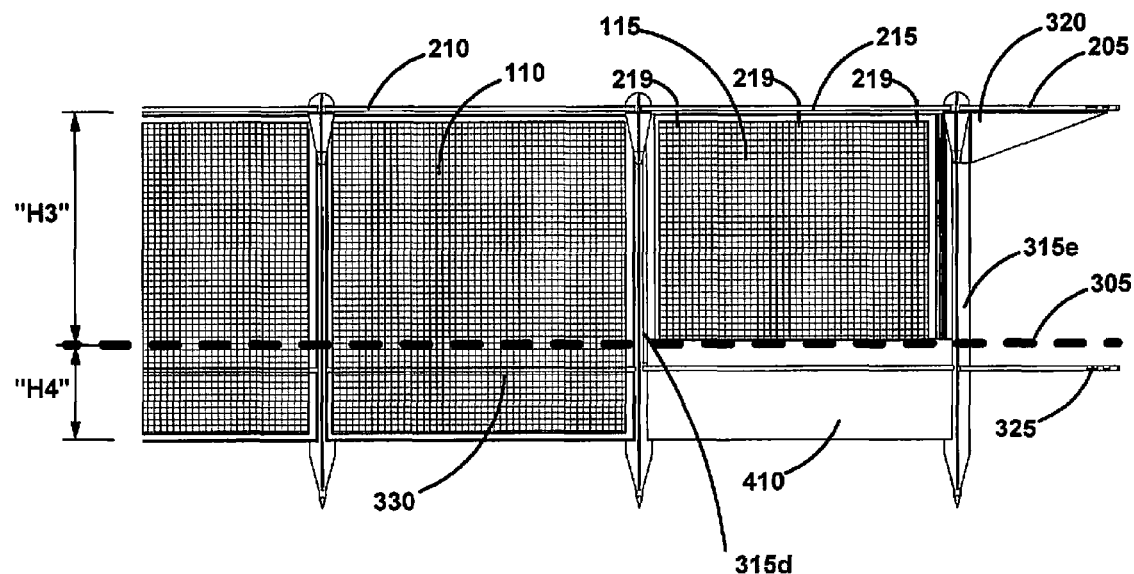
FIG. 4 is a side view of a portion of the animal-resistant fence of FIG. 1 including a gate.

Turning to FIG. 4, the gate 115 is positioned between a first post 315d and a second post 315e. Specifically, the gate 115 is hingedly attached to the first post 315d, and is configured to rotate about the post 315d to move between a closed state and an open state. The gate 115 defines a height "H3" less than the height "H2" of the first panel 110. The height "H3" also corresponds to the height of the portions of the first panels 110 that are above the ground level 305. Beneath the gate 115 is a solid panel 410 mounted between the two posts 315d and 315e and buried beneath the ground level 305.

FIGS. 5A-5C provide detailed illustrations of a post 315 and a strut 320. The post 315 includes a rod 613 having a sharp tip 617 at the lower end 317 of the post 315 for penetrating the ground. Four identical fins 615a-d extend radially outwardly from the rod 613 and extend along most of the height of the rod 613. The fins 615a-d are arranged around the rod 613 so that adjacent fins are at right angles with respect to each other. Accordingly, the post 315 has a cross-like cross-section. A portion of the fins 615a-d at the lower end 317 of the post 315 tapers down to the surface of the rod 613.

As shown in FIG. 1, the struts 320 are configured to support the barrier 200 including the second panels 210, the upper corner panels 205, and the upper gate panel 215. As shown in FIGS. 5A-5C, each strut 320 is mounted to one fin 615a of the post 315. Specifically, the strut 320 includes a triangular member 607, a vertical flange 603 coupled to one side of the triangular panel 607, and a horizontal flange 605 coupled to another side of the triangular panel 607. The strut 320 also includes a slotted member 610 that protrudes from the surface of the vertical flange 603. The slotted member 610 is configured to receive the fin 615a so that the strut 320 can be mounted onto the post 315. The horizontal flange 605 is configured to support the barrier 200.

The strut 320 and the post 315 may be coupled together in a variety of ways. In some embodiments, the strut 320 is an integral part of the post 315. For example, the strut 320 may be permanently attached to the post 315 by using an adhesive or by using a welding or overmolding process. In another example, the strut 320 and the post 315 may be molded together as a single component of the animal-resistant fence 10.

In other embodiments, the strut 320 is detachably connected to the post 315. For example, the slotted member 610 of the strut 320 releasably engages with the fin 615a of the post 315. Accordingly, when the second barrier 200 needs to be removed, e.g., for maintenance, the strut 320 can simply be detached from the fin 615a. Also, the distance between the second barrier 200 and the ground level 305 may be selectively chosen by attaching the strut 320 at a desired height on the fin 615a.

In yet other embodiments as illustrated in FIG. 5D, the strut 320 can be hingedly attached to the post 315 via a pivot connection. The slotted member 610 of the strut 320 and the fin 615a of the post 315 may each include an aperture through which a bolt 620 or other similar fastener is placed to secure the strut 320 to the post 315. In this configuration, the strut 320 and corresponding second panels 210 that are supported by the strut 320 can rotate about the bolt 620 to transit between a first position substantially perpendicular to the post 315 and a second position substantially aligned with or parallel to the post 315.

Further, as illustrated in FIG. 5E, a post 315 has two struts connected to it: a first upper strut 320 attached to an upper portion of the post 315, and a second lower strut 340 attached to a lower portion of the post 315. The second lower strut 340 has the same configuration as the first upper strut 320 except that the second lower strut 340 is configured to be disposed beneath the ground level 305 to support the third barrier 300, which includes the third panels 330 and third corner panels 325. The third barrier 300 prevents or at least impedes animals, such as rodents, from simply digging under the first barrier 100 to gain access to the plants that are contained within the enclosure formed by the first barrier 100. Indeed, an animal trying to dig under the first barrier 100 will be stopped by the third barrier 300.

When the lower struts 340 are mounted to the posts 315, each third panel 330 would be supported by two lower struts 340 mounted to lower portions of two respective posts 315. These second lower struts 340 are used to support the third barrier 300.

In one embodiment as illustrated in FIG. 5E, the post 315 may have both struts 320 and 340 attached to it. In other embodiments, the post 315 may have only one strut attached to it, either the first upper strut 320 or the second lower strut 340. When the post 315 does not have the second lower strut 340 connected to it, the third barrier 300 may be buried in the ground adjacent to the posts 315 and/or and the first barrier 100.

Figure 6A:
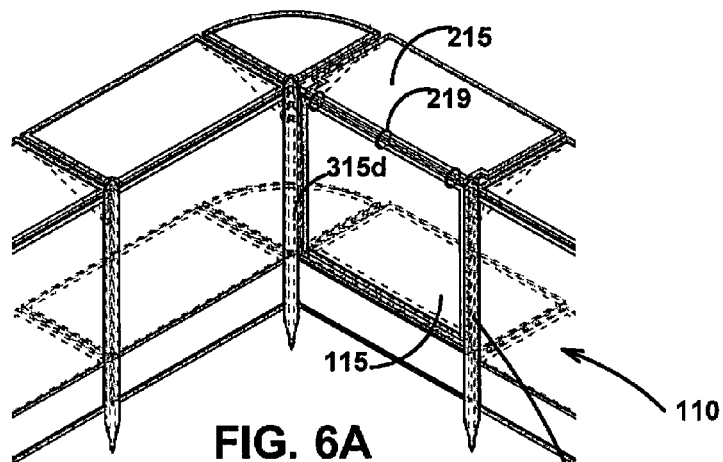
FIG. 6A is a perspective view of a portion of the animal-resistant fence of FIG. 1 showing the gate in a closed state.
Figure 6B:
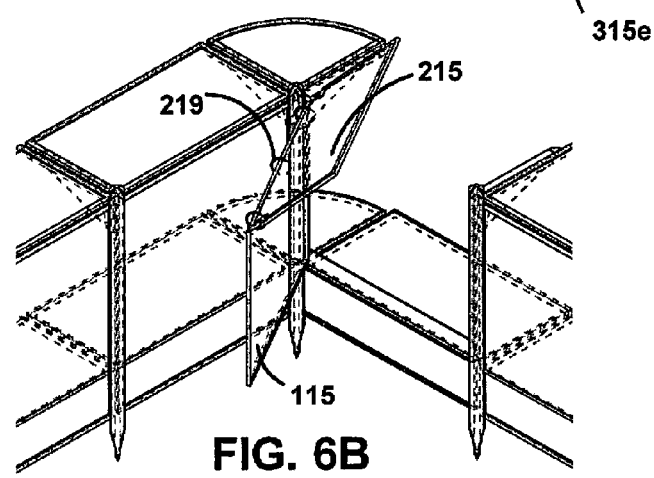
FIG. 6B is a perspective view of a portion of the animal-resistant fence of FIG. 1 showing the gate in a partially open state.
Figure 6C:
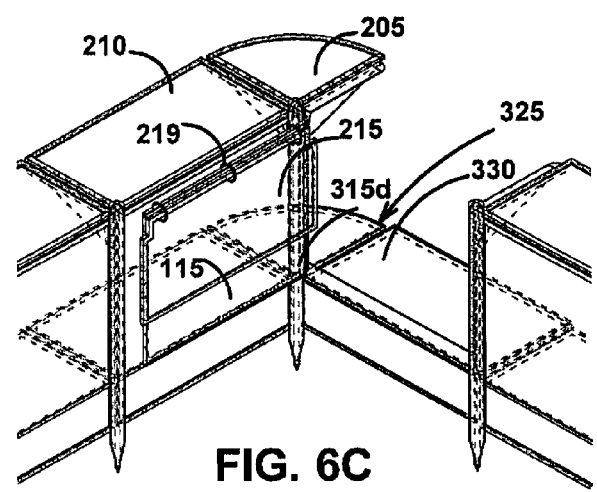
FIG. 6C is a perspective view of a portion of the animal-resistant fence of FIG. 1 showing the gate in a completely open state.

Turning to FIGS. 6A-6C, the gate 115 is hingedly attached to a corner post 315d, such that the gate 115 is configured to rotate about the corner post 315d. The upper gate panel 215 is hingedly attached to the gate 115 via the circular hooks 219, such that the upper gate panel 215 can rotate with respect to the gate 115 about the circular hooks 219. FIGS. 6A-6C illustrate various states of the gate 115. FIG. 6A illustrates the gate 115 in its completely closed state. In this state, the gate 115 is completely aligned with an adjacent first panel 110 and meets the other post 315e. The upper gate panel 215 is coplanar with the second barrier 200. FIG. 6B illustrates the gate 115 in its partially open state, spaced away from the post 315e. In this state, the upper gate panel 215 may be rotated upwards about the circular hooks 219. FIG. 6C illustrates the gate 115 in its completely open state.

As shown in FIG. 1, the fence 100 also includes a third barrier 300 positioned beneath the ground level 305. As illustrated in FIGS. 6A-6C, the third barrier 300 is similar to the second barrier 200 but is buried beneath the ground level 305. As described above, the third barrier 300 is configured to prevent animals from digging under the first barrier 100. In some embodiments, the barrier 300 is positioned perpendicular to the first barrier 100. In other embodiments, the barrier 300 is positioned at an acute or obtuse angle with respect to the first barrier 100. In yet other embodiments, a portion of the third barrier 300 may be positioned above the ground level 305, and the remaining portion of the third barrier 300 is positioned below the ground level 305.

As shown in FIGS. 6A-6C, the barrier 300 includes third, lower panels 330. Each lower panel 330 extends from a lower portion of a corresponding first panel 110 outwardly beyond the enclosure defined by the first barrier 100. The barrier 300 also includes lower corner panels 325.

In some embodiments, each third panel 330 is positioned at a 90° angle with respect to a corresponding first panel 110. In other embodiments, each third panel 330 defines a 75° angle with respect to a corresponding first panel 110. In yet other embodiments, each third panel 330 defines an acute or obtuse angle with respect to a corresponding first panel 110.

In some embodiments, a second panel 210 is positioned at a first acute angle with respect to a corresponding first panel 110, and a third panel 330 is positioned at a second different acute angle with respect to the same first panel 110.

Figure 7A:
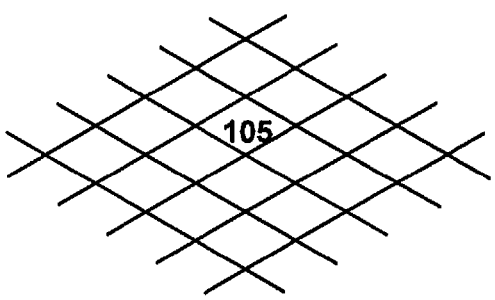
FIGS. 7A to 7H are perspective views illustrating a method of installing the animal-resistant fence according to embodiments of the present disclosure.
Figure 7B:
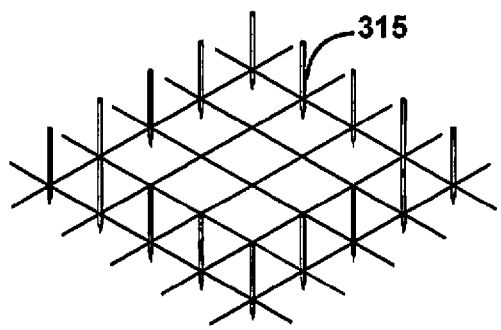
Figure 7C:
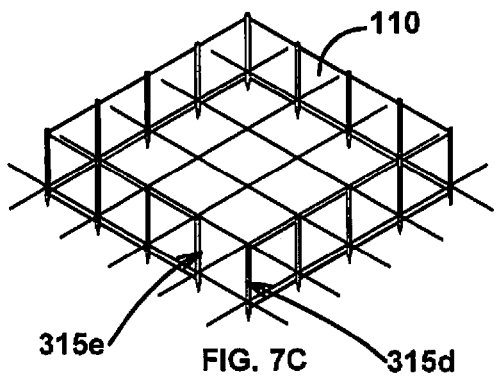
Figure 7D:
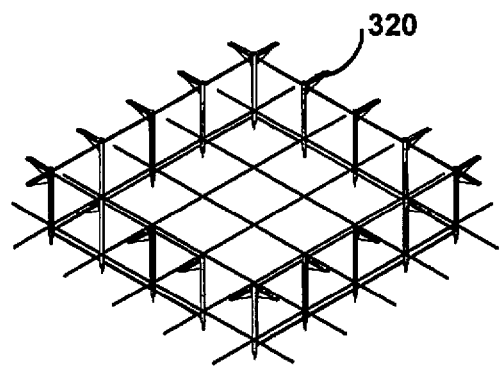

FIGS. 7A-7H illustrate individual steps for installing the animal-resistant fence 10. As illustrated in FIG. 7A, a user first prepares a grid layout 105 where the fence 10 is to be built. As shown in FIG. 7B, the user places posts 315 around an outer perimeter of the grid layout 105 so that there is a uniform distance between adjacent posts 315. As shown in FIG. 7C, the user mounts a first panel 110 to pairs of adjacent posts 315, leaving an open space between posts 315d and 315e for later installation of the gate 115. As shown in FIG. 7D, the user attaches a strut 320 to the top portion of each post 315 that is not a corner post 315. The user attaches two struts 320 to each corner post 315, and the two struts 320 are positioned at a 90° angle with respect to each other.

Figure 7E:
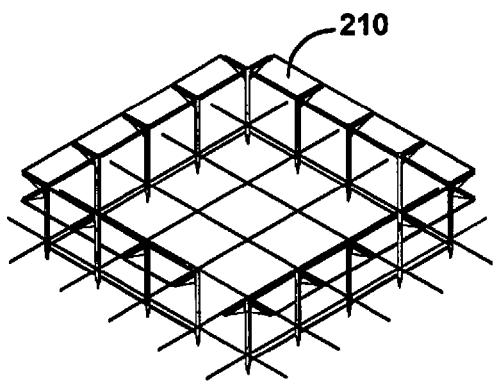
Figure 7F:
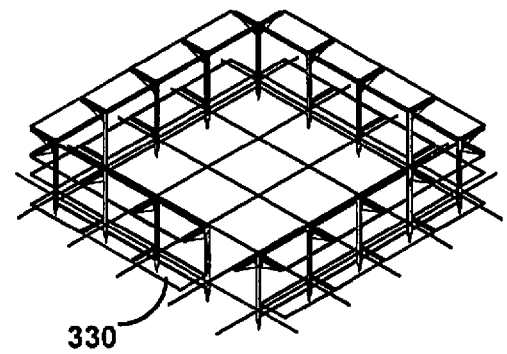
Figure 7G:
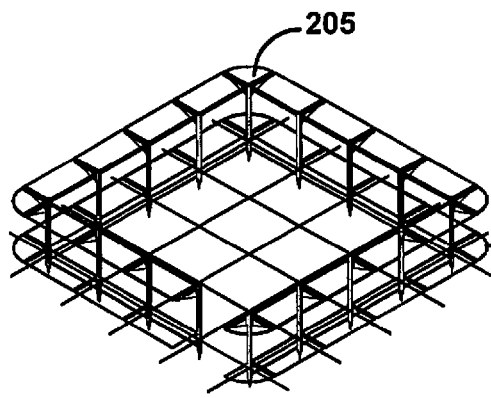
Figure 7H:
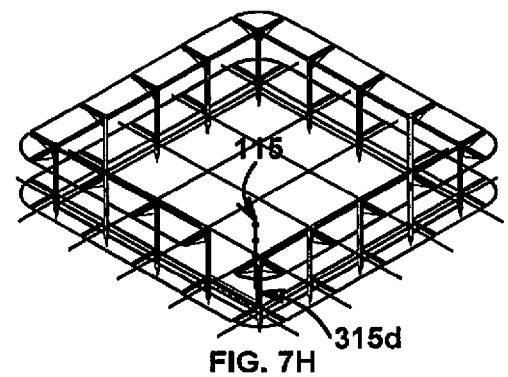

Then, as shown in FIG. 7E, the user places a second panel 210 between each pair of adjacent struts 320. Next, as shown in FIG. 7F, the user removes a portion of the ground adjacent to the lower portion 118 of the first panels 110, and attaches a third barrier 300 including lower, third panels 330 to the lower portion 118 of the first panels 110, which is below the surface of the ground. In some embodiments, the user attaches a lower strut 340 to the lower portion of each post 315, and attaches the third barrier 300 to the lower struts 340. As shown in FIG. 7G, the user attaches upper corner panels 205 to respective upper struts 320 positioned at the upper corners of the fence 10 and attaches lower corner panels 325 to respective lower struts 340 positioned at the lower corners of the fence 10. As shown in FIG. 7H, the user attaches the gate 115 to the post 315d, buries a solid panel 410 under the ground between the two posts 315d and 315e directly beneath the gate 115, and places a lower panel 330 adjacent to the solid panel 410. Finally, the user covers the barrier 300 with the soil that was removed from the ground.

Figure 8:
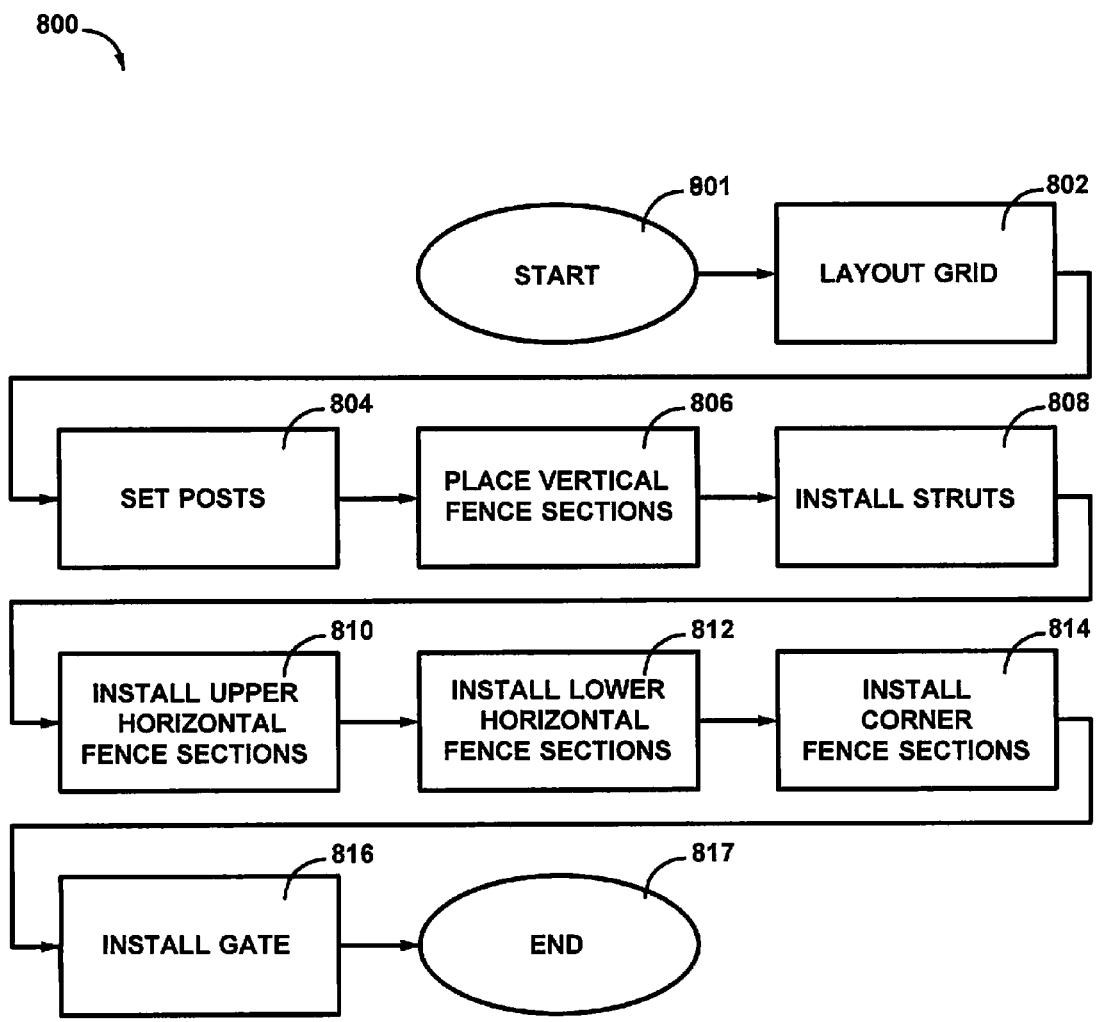
FIG. 8 is a flowchart of a method of installing components of the animal-resistant fence according to embodiments of the present disclosure.

FIG. 8 is a flowchart of a method 800 of installing the animal-resistant fence according to some embodiments of the present disclosure. The method includes arranging a layout grid 105 at step 802, setting posts 315 at step 804, and placing vertical fence sections, e.g., first panels 110 at step 806. The method further includes installing struts 320 on the posts 315 at step 808, installing upper horizontal fence sections, e.g., second panels 210, at step 810, and installing lower horizontal fence sections, e.g., third panels 330, at step 812. Still further, the method at step 814 includes installing corner fence sections, e.g., both the upper corner panels 205 and the lower corner panels 325, and installing the gate 115 at step 816.

As illustrated in FIG. 1, the fence 10 includes all three barriers 100, 200 and 300. In other embodiments, the fence 10 includes only the first barrier 100 and the third barrier 300. In yet other embodiments, the fence 10 includes the first barrier 100 and the second barrier 200.

It is understood that the various components of the animal-resistant fence may be secured together using a variety of mechanisms including fasteners, nails, rivets, nuts and bolts, screws, or glue.

In some embodiments, the first panel 110 includes a non-biodegradable material. In other embodiments, at least one of the first panel 110, the second panel 210, and the third panel 330 includes a mesh material. In yet other embodiments, at least one of the first panel 110, the second panel 210, and the third panel 330 includes a metallic material. In still other embodiments, at least one of the first panel 110, the second panel 210, and the third panel 330 includes a transparent material.

While several embodiments of the present disclosure have been shown in the drawings and/or described in the above description, it is not intended that the disclosure be limited to what is shown in the drawings and/or described in the above description, as it is intended that the disclosure be as broad in scope as the art will allow and that the specification be read in a similar manner. Therefore, the above description should not be construed as limiting, but merely as exemplifications of particular embodiments. Different embodiments of the present disclosure may be combined with one another based upon the particular needs of the fence to prevent entry of animals. Those skilled in the art will envision other modifications within the scope and spirit of the claims below.

The invention claimed is:

1. A modular fence comprising:
    a plurality of posts, each of which comprises a plurality of longitudinally extending fins extending radially outward from each post relative to a longitudinal axis thereof;
    a plurality of first panel members, each of which is configured to extend between a respective pair of adjacent posts of the plurality of posts perpendicular to or substantially perpendicular to a ground level and a respective edge of each first panel member is configured to engage with a fin of the plurality of fins on a respective one of the pair of posts;
    a plurality of struts, each comprising a flange, a slotted member defining a slot configured to receive a fin of the plurality of fins of a respective one of the plurality of posts to enable attachment of each strut to a post of the plurality of posts, and a bracing member disposed between the flange and the slotted member to support the flange by engaging with a post of the plurality of posts, the plurality of struts comprising a plurality of upper struts configured to attach to upper portions of a respective plurality of posts and a plurality of lower struts configured to attach to lower portions of a respective plurality of posts;
    a plurality of second panel members, each of which is configured to be disposed on the flanges of a respective pair of adjacent upper struts of the plurality of upper struts, the flange of a respective one of the pair of upper struts being configured to support a respective edge of each second panel member, wherein the second panel member is positionable at least partially non-parallel relative to the first panel members; and
    a plurality of third panel members, each of which is configured to be disposed on the flanges of a respective pair of adjacent lower struts of the plurality of lower struts, the flange of a respective one of the pair of lower struts being configured to support a respective edge of each third panel member, wherein the third panel member is positionable at least partially non-parallel relative to the first panel members.

2. The modular fence of claim 1, wherein each of the plurality of upper struts is hingedly attached to a post of the plurality of posts to permit movement of a second panel member of the plurality of second panel members from a first position substantially perpendicular to the first panel member to a second position substantially parallel to the first panel member.

3. The modular fence of claim 1, wherein each of the plurality of second panel members extends substantially perpendicularly from an upper portion of a first panel member of the plurality of first panel members.

4. The modular fence of claim 1, wherein each of the plurality of third panel members extends substantially perpendicularly from a lower portion of a first panel member of the plurality of first panel members beneath the surface of the ground.

5. The modular fence of claim 1, wherein at least one of the plurality of first panel members, the plurality of second panel members, and the plurality of third panel members comprises a mesh material.

6. The modular fence of claim 1, wherein at least one of the plurality of first panel members, the plurality of second panel members, and the plurality of third panel members comprises a metallic material.

7. The modular fence of claim 1, wherein at least one of the plurality of first panel members, the plurality of second panel members, and the plurality of third panel members comprises a transparent material.

8. The modular fence of claim 1, further comprising a panel member hingedly attached to a post of the plurality of posts to form a gate.

9. The modular fence of claim 1, wherein the plurality of first panel members, the plurality of second panel members, and the plurality of third panel members each comprises a mesh material and a frame surrounding the mesh material.

\* \* \* \* \*